United States Patent [19]
Metezeau et al.

[11] Patent Number: 6,151,885
[45] Date of Patent: Nov. 28, 2000

[54] TURBOJET-ENGINE THRUST REVERSER WITH INTERNAL CLAMSHELLS

[75] Inventors: Fabrice Henri Emile Metezeau; Bernard Guy Vauchel, both of Le Havre, France

[73] Assignee: Societe Hispano Suiza Aerostructures, France

[21] Appl. No.: 09/159,549

[22] Filed: Sep. 24, 1998

[30] Foreign Application Priority Data

Sep. 25, 1997 [FR] France .................................. 97 11926

[51] Int. Cl.[7] ........................................................ F02K 1/60
[52] U.S. Cl. ...................... 60/226.2; 60/232; 244/110 B; 239/265.29; 239/265.31
[58] Field of Search .................................. 60/226.2, 230, 60/232; 239/265.27, 265.29, 265.31; 244/110 B

[56] References Cited

U.S. PATENT DOCUMENTS

| | | |
|---|---|---|
| 2,847,823 | 8/1958 | Brewer . |
| 2,950,595 | 8/1960 | Laucher et al. . |
| 2,972,681 | 3/1961 | Bennett et al. . |
| 3,550,855 | 12/1970 | Feld et al. . |
| 4,183,478 | 1/1980 | Rudolph ................................ 60/226.2 |
| 4,340,178 | 7/1982 | Lawson . |
| 4,410,152 | 10/1983 | Kennedy et al. ....................... 60/226.2 |
| 4,790,495 | 12/1988 | Greathouse et al. . |
| 4,860,956 | 8/1989 | Fage ..................................... 239/265.19 |
| 5,181,676 | 1/1993 | Lair ........................................ 60/226.2 |
| 5,392,991 | 2/1995 | Gatti et al. ............................... 60/232 |
| 5,806,302 | 9/1998 | Cariola et al. ......................... 60/226.2 |
| 5,853,148 | 12/1998 | Standish et al. ....................... 60/226.2 |
| 5,863,014 | 1/1999 | Standish .................................. 60/232 |

FOREIGN PATENT DOCUMENTS

| | | |
|---|---|---|
| 0 290 371 | 11/1988 | European Pat. Off. . |
| 0 574 730 A1 | 12/1993 | European Pat. Off. . |
| 2 348 371 | 4/1976 | France . |
| 2 601 077 | 1/1988 | France . |
| 2 638 783 | 5/1990 | France . |
| 2 672 339 | 8/1992 | France . |

*Primary Examiner*—Ted Kim
*Attorney, Agent, or Firm*—Bacon & Thomas PLLC

[57] ABSTRACT

A turbojet-engine thrust reverser comprises a displaceable sub-assembly including two internal clamshells (12) mounted on stationary pivots (18) of a stationary structure (1) and an annular, axially displaceable structure (11). The displaceable structure forms the external, downstream part (13) of a cowling. In the forward-thrust mode, the displaceable structure forms a downstream portion (15) of a radial outer wall of the flow path and forms the entire trailing edge by covering the clamshells (12) such that the clamshells form part of the radial outer wall of the flow path.

15 Claims, 3 Drawing Sheets

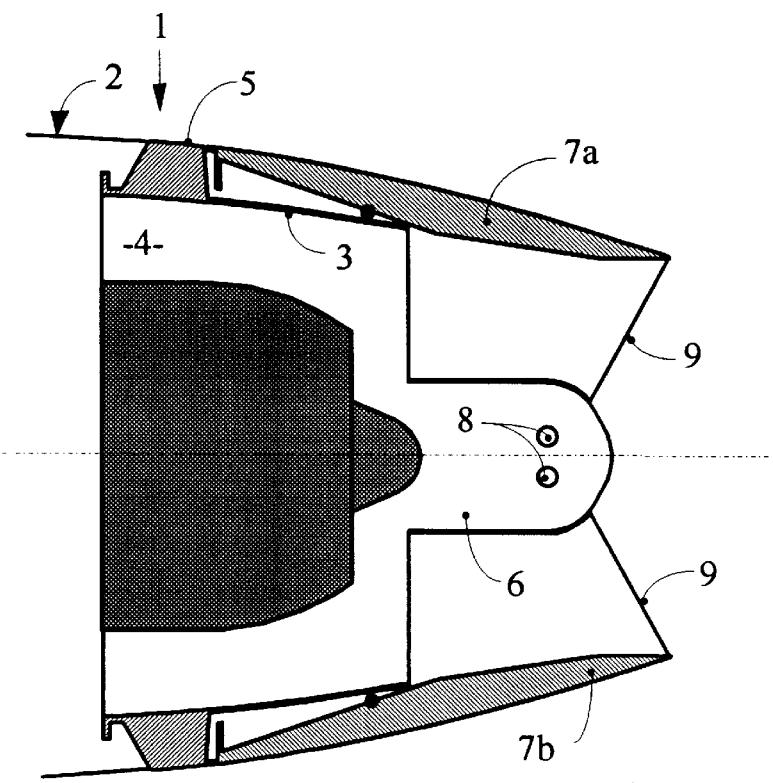
Fig : 1
PRIOR ART
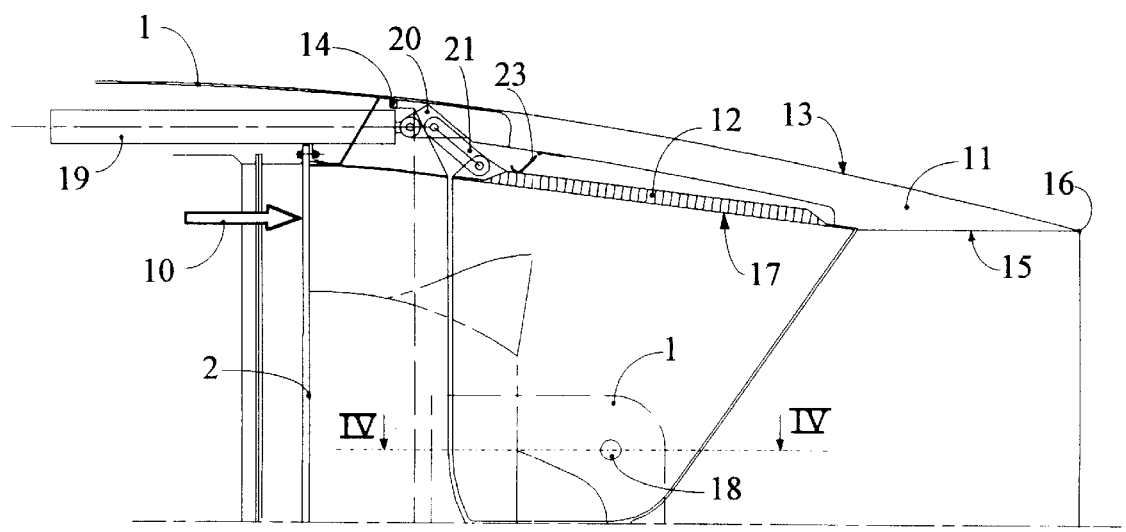
Fig : 2

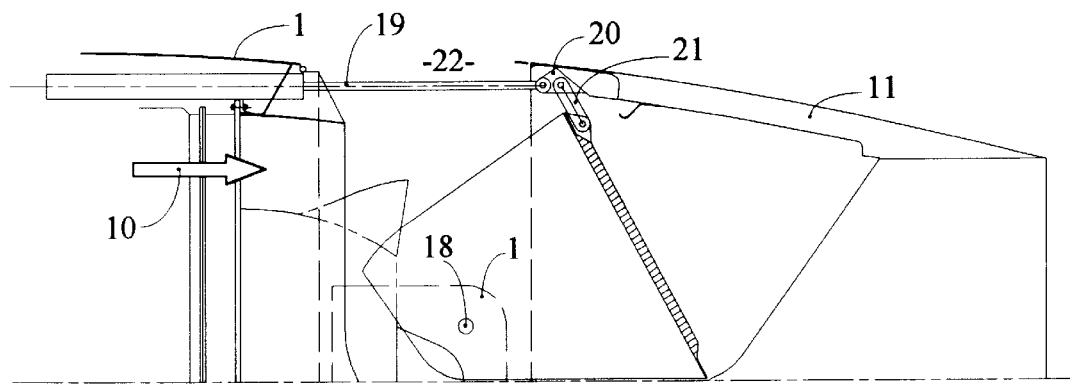
Fig : 3
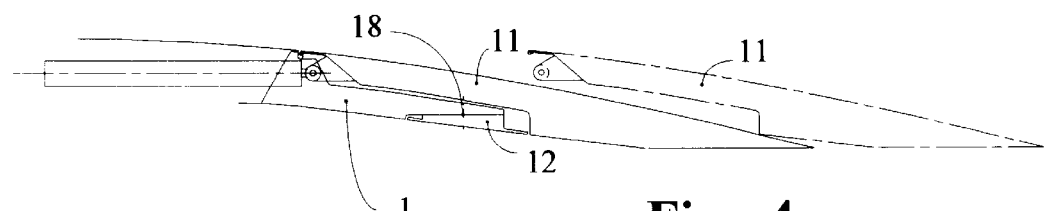
Fig : 4

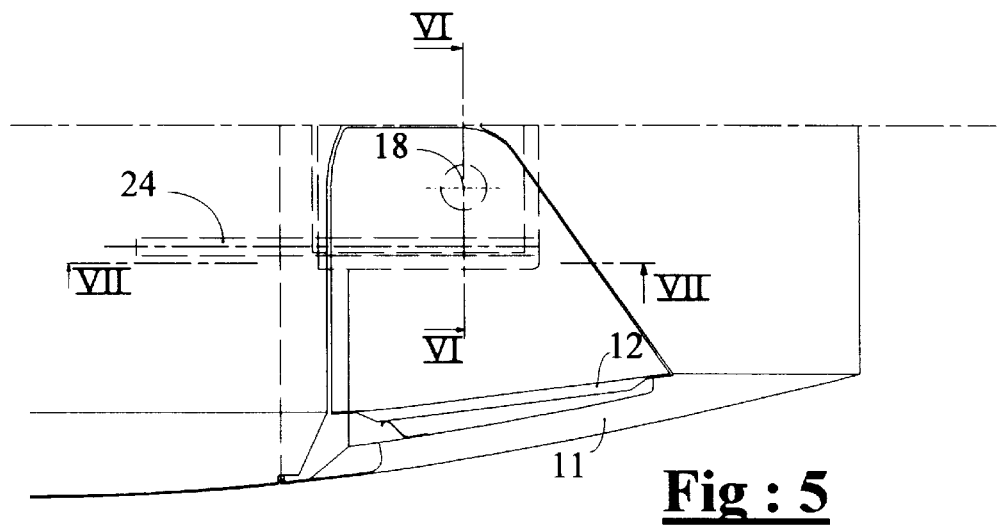
Fig : 5
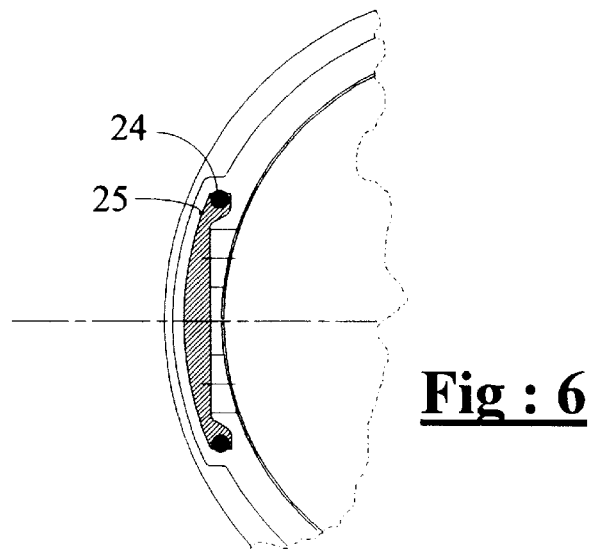
Fig : 6
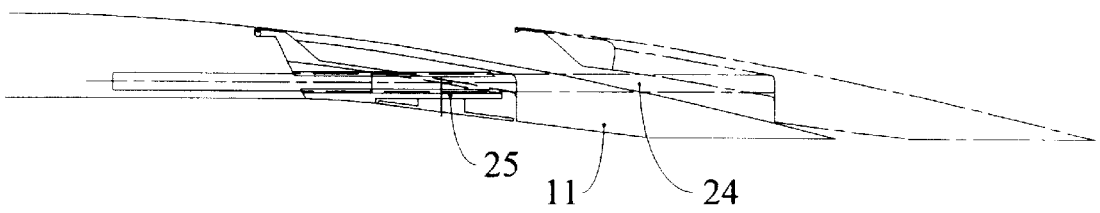
Fig : 7

TURBOJET-ENGINE THRUST REVERSER WITH INTERNAL CLAMSHELLS

BACKGROUND OF THE INVENTION

1. Field of the Invention

The present invention concerns a thrust reverser having internal clamshells which is designed to be mounted on aircraft engines of the turbojet-engine bypass or straight flow types.

2. Description of the Related Art

Usually thrust reversers mounted downstream of the engine assume a dual function: to form an exhaust nozzle in the forward-thrust mode; and to implement thrust reversal in the thrust-reversal mode.

In fact, these thrust reversers, called "target" or "clamshell" reversers, are fitted with two clamshells pivoting on a stationary or fixed structure, usually affixed to a cowling surrounding the turbo-jet engine.

These thrust reversers offer the advantage of being comparatively simple and lightweight. The kinematics is simple. The clamshells form the engine exhaust nozzle in the forward-thrust mode and form baffles causing flow reversal in the thrust-reversal mode.

As regards this type of downstream-baffles thrust reverser, designs using a stationary pivot means are known, for example, from French patent 2,348,371 and U.S. Pat. No. 3,550,855, wherein the pivot means are mounted downstream of the leading edge of the thrust reverser doors to assure sufficient distance from said doors relative to the engine exhaust in the thrust-reversal mode.

U.S. Pat. No. 2,847,823 discloses a thrust reverser fitted with downstream baffles and comprising a stationary, rear ring. FIG. 1 of the attached drawings shows an embodiment of this known type of thrust-reverser.

In this instance, the thrust reverser consists of a stationary upstream structure 1 affixed to the turbojet engine 2, or its cowling, an inner wall 3 externally bounding an annular duct 4, through which fluid flow passes, and an external fairing 5 affixed to the inner wall 3 and two side structures 6. Two downstream baffles, i.e. clamshells 7a and 7b, are pivotably mounted on the stationary structure 1, in particular using pivots 8 supported in the side structures 6. The side structure 6 also support a system controlling the displacement and locking of the clamshells 7a and 7b.

A downstream end 9 of the clamshells 7a and 7b, constituting the trailing edge of the outer wall extended beyond the downstream side of the fairing 5, is not coplanar. Thus, during forward-thrust operation when the clamshells 7a and 7b are integrated into the duct's outer wall in the extension of stationary structure 1, large aerodynamic losses may severely degrade the desired performance. This is because the clamshells 7a and 7b must remain slanted relative to the reversed flow and leaks between the two clamshells must be minimized to achieve the required thrust-reversal.

Corrective solutions already have been suggested. Illustratively, the French patent document A 2,638,783 proposes adding movable side flaps to the thrust reverser. This, however, requires hinge means and entails the drawbacks of increased complexity, less reliability, and increased weight, contrary to ever-desired weight reduction for aeronautical applications.

Similarly, the French patent document A 2,601,077 calls for a stationary structure downstream of the thrust-reverser baffles. Consequently, the lengthening of the duct and the means required to displace the baffles and achieve a sufficient opening in the thrust-reversal position upstream of said stationary structure entail increased weight as well.

Moreover, pivoting inner-clamshell thrust reversers are known. U.S. Pat. No. 4,790,495 illustrates one embodiment which has the drawback of a remnant, unsmooth outer rear cowling profile resulting in aerodynamic losses and requiring a complex control-and-locking system. Another design solution, described in U.S. Pat. No. 4,340,178, proposes a system of clamshell pivots on rails. The system raises complexity-and-reliability problems and involves increased weight.

SUMMARY OF THE INVENTION

One of the objectives of the invention is to minimize forward-thrust aerodynamic losses caused by non-coplanar trailing edges, without incurring the increases in weight and/or complexity of the prior known designs, by implementing a system with simplified kinematics and without unfavorable weight penalties.

A turbojet-engine thrust reverser according to the invention has internal clamshells and a displaceable annular downstream structure. The displaceable structure forms a downstream external part of the cowling and the downstream part of a radial outer wall bounding a flow path of the turbojet engine. In the forward-thrust mode, the displaceable structure forms the totality of a trailing edge by covering the internal clamshells such that the clamshells also form part of the radial outer wall of the flow path. The clamshells are pivotable on a plurality of stationary pivots which are supported by the stationary structure.

Advantageously, when in the thrust-reversal mode, no structure projects beyond the outer surface of the cowling. Advantageously, the displaceable structure can be made of a lightweight material, assuring optimal weight, reliability and low manufacturing cost, regardless of the composition of the internal clamshells deflecting hot flow from the turbojet engine.

BRIEF DESCRIPTION OF THE DRAWINGS

Other features and advantages of the invention are elucidated below in the following description of preferred embodiments of the invention, with reference to the attached drawings, in which:

FIG. 1 shows is a schematic longitudinal section of a known thrust reverser in a plane through the axis of rotation of the rear part of a turbojet engine;

FIG. 2 shows a schematic half-view similar to that of FIG. 1 of one embodiment of the invention;

FIG. 3 shows the embodiment of FIG. 2 in a thrust-reversal mode;

FIG. 4 shows a sectional view along line IV—IV of FIG. 2 of an embodiment of the clamshell pivots;

FIG. 5 shows a schematic sectional half view similar to that of FIG. 2 of an embodiment of a guide system which is reinforced by the displaceable downstream annular structure; and FIGS. 6 and 7 show sectional views along lines VI—VI and VII—VII, respectively, of the embodiment shown in FIG. 5.

DETAILED DESCRIPTION OF THE PREFERRED EMBODIMENTS

FIGS. 2 and 3 show a turbojet-engine thrust reverser of the invention in the forward-thrust mode and the thrust-reversal mode, respectively.

A stationary upstream thrust-reverser structure 1 is affixed on a turbojet-engine casing 2. As shown in the drawings, the turbojet engine is of the bypass type and the casing 2 forms an upstream part of a radial outer wall bounding a flow path of the bypass flow denoted by the arrow 10. The stationary structure 1 forms an upstream part of a cowling of the turbojet engine.

The displaceable assembly of the thrust reverser consists in part of two clamshells 12 forming an annular entity. An outer surface 13 of a displaceable, annular downstream structure 11 forms a downstream, external part of the cowling as an extension of the stationary structure 1 with interposition of a seal 14 to assure sealing in the forward-thrust mode shown in FIG. 2. An inside surface 15 of the displaceable structure 11 forms the downstream part of the radial outer wall bounding the turbojet engine's flow path. A downstream end 16 of the displaceable structure 11 forms the totality of a trailing edge of the turbojet engine's exhaust duct, which thus is coplanar in a plane perpendicular to the turbojet engine's axis of rotation.

In the forward-thrust mode, the clamshells 12 assume a retracted position and are covered by an upstream portion of the displaceable structure 11. An internal surface 17 of the clamshells 12 joins the internal surface 15 of the displaceable structure 11 and furthermore forms a part of the radial outer wall bounding the turbojet engine's flow path. Each internal clamshell 12 is pivotable on pivots 18 situated on each side of the stationary structure 1. FIG. 4 shows an illustrative emplacement of a pivot 18 on the stationary structure 1.

The upstream stationary structure 1 supports a displacement mechanism of the movable thrust-reverser assembly. In the embodiment shown in FIGS. 2 and 3, this mechanism comprises linear actuators 19 having a rod which hinges on a bracket 20, which is rigidly joined to the displaceable structure 11. In this embodiment, each internal clamshell 12 is connected to the displaceable structure 11 by a linkrod 21 which is situated in the axial plane of the respective clamshell and is linked upstream to the bracket 20 of the displaceable structure 11. Of course, other equivalent mounting arrangements may be used. In particular, the linkrod may be connected to the displaceable structure downstream of the drive point on the respective clamshell. The connection furthermore may be implemented using two coupled linkrods mounted with one on each side of the axial plane of each clamshell. Synchronized actuators cooperating with guide means may be used as well.

The thrust-reverser's displaceable assembly also may be driven by a linear actuator connected to one or both clamshells which, in this case, also drives the displaceable structure. The linear actuator(s) may be mounted near the clamshell pivots.

Operation of the thrust reverser follows directly from the above description relating to FIGS. 2 and 3. The change in configuration from the forward-thrust mode shown in FIG. 2 to the configuration of the thrust-reversal mode shown in FIG. 3 is implemented in this embodiment by driving the linear actuators 19. The displaceable structure 11 is axially displaced to the rear to clear a passageway 22 in the cowling for the flow deflected between the stationary structure 1 and an upstream edge of the displaceable structure 11. Simultaneously, the internal clamshells 12 pivot on their respective pivots 18 and will obstruct the turbojet engine's flow path by joining edge against edge along the longitudinal turbojet-engine axis, thereby deflecting the flow and directing it toward the passageway 22 to implement thrust-reversal.

Further advantages of the invention are that the pressure exerted by the flow on the clamshells 12 has little or no effect at all on their balance or their mechanical strength. Moreover, the displacement mechanism driving the thrust-reverser's displaceable assembly may advantageously include wholly reliable locking means for the forward-thrust mode. The reliability and simplicity of the link rod connections between the clamshells and the displaceable structure are exceptional. It should be noted also that due to its circumferential continuity, the displaceable structure 11 offers sufficient rigidity. In the forward-thrust mode, aerodynamic accidents are minimized and leaks are reduced because the seal is circumferential and is easily manufactured.

Furthermore, certain improvements may be introduced in the above-described embodiment of the invention, namely:

a vibration damper may be added to the clamshells 12 to improve the aerodynamic flow in the forward-thrust mode and, in particular, may be combined with the displaceable structure 11, which is illustratively shown by mounting a spring system 23 between the clamshell 12 and the displaceable structure 11;

bypass cascades also may be added in certain thrust-reverser applications to improve reversed-thrust performance;

in the manner known for the thrust-reverser doors, the upstream portion of the outer part of the displaceable structure 11 may project beyond the upstream portion of the clamshells 12, thereby acting as upstream spoilers for the bypass flow;

matching streamlined fairings may be added when installation of the pivots and the linear actuators in the space between the outer surface of the cowling and the outer surface of the flow duct is difficult.

FIGS. 5 through 7 show a variation of the displacement mechanism for the displaceable structure 11. A plurality of slide guides 25 are mounted on either side of a side beam of the stationary structure 1 and a corresponding plurality of support guide rods 24 are connected to the displaceable structure 11 in such manner as to provide reinforced guidance of the displacement of the displaceable structure 11. This assembly also may be reversed, or a single slide may be configured along the axis of the beams.

The present invention is not restricted to the above described embodiments, but on the contrary includes all variations that might be introduced by a person skilled in the art without departing from the scope and spirit of the invention as set forth in the claims that follow.

We claim:

1. A turbojet-engine thrust reverser, comprising:

a stationary structure defining an upstream part of a cowling of a turbojet engine;

an axially displaceable, annular structure located downstream of the stationary structure which forms a downstream external part of the cowling and a downstream part of a radial outer wall bounding a flow path of the turbojet engine, said displaceable structure being affixed to a casing of the turbojet engine;

a plurality of stationary pivots supported on the stationary structure;

two displaceable, internal clamshells separate from the displaceable structure and which are pivotable on the plurality of pivots to extend into a position in a thrust-reversal mode wholly contained within the outer radial surface of the stationary structure to constitute flow-deflecting baffles by joining edge to edge along a longitudinal turbojet engine axis to provide thrust reversal; and a displacement mechanism supported by the stationary structure which controls displacement of the displaceable structure and the clamshells;

wherein, in a forward-thrust mode, the displaceable structure forms the totality of a trailing edge by covering the clamshells such that the clamshells also form part of the radial outer wall of the flow path and in a reverse-thrust mode, the displacement mechanism axially displaces the displacement structure to clear a passageway in the cowling for flow deflected between the stationary structure and an upstream edge of the displaceable structure.

2. A turbojet-engine thrust reverser according to claim 1, further comprising:

a vibration damper which is mounted between each clamshell and the displaceable structure.

3. A turbojet-engine thrust reverser according to claim 2, wherein the vibration damper comprises a spring system.

4. A turbojet-engine thrust reverser according to claim 1, wherein the displacement mechanism comprises:

a plurality of slide guides mounted on the stationary structure; and a corresponding plurality of guide rods connected to the displaceable structure, the guide rods being slideably disposed in the slide guides for axial displacement of the displaceable structure.

5. A turbojet-engine thrust reverser according to claim 1, wherein the displacement mechanism comprises:

a plurality of slide guides mounted on the displaceable structure; and a corresponding plurality of guide rods connected to the stationary structure, the guide rods being slideably disposed in the slide guides for axial displacement of the displaceable structure.

6. A turbojet-engine thrust reverser according to claim 1, wherein the displacement mechanism comprises:

a plurality of synchronized linear actuators connected to the displaceable structure; and at least one linkrod connecting each of the clamshells to the displaceable structure.

7. A turbojet-engine thrust reverser according to claim 6, wherein the displacement mechanism further comprises:

a plurality of slide guides mounted on the stationary structure; and a corresponding plurality of guide rods connected to the displaceable structure, the guide rods being slideably disposed in the slide guides for axial displacement of the displaceable structure.

8. A turbojet-engine thrust reverser according to claim 6, wherein the displacement mechanism further comprises:

a plurality of slide guides mounted on the displaceable structure; and a corresponding plurality of guide rods connected to the stationary structure, the guide rods being slideably disposed in the slide guides for axial displacement of the displaceable structure.

9. A turbojet-engine thrust reverser according to claim 6, further comprising:

a vibration damper which is mounted between each clamshell and the displaceable structure.

10. A turbojet-engine thrust reverser according to claim 9, wherein the vibration damper comprises a spring system.

11. A turbo-jet engine thrust reverser according to claim 1, wherein the displacement mechanism comprises:

at least one linear actuator connected to at least one of the clamshells; and at least one linkrod connecting each of the clamshells to the displaceable structure.

12. A turbojet-engine thrust reverser according to claim 11, wherein the displacement mechanism comprises:

a plurality of slide guides mounted on the stationary structure; and a corresponding plurality of guide rods connected to the displaceable structure, the guide rods being slideably disposed in the slide guides for axial displacement of the displaceable structure.

13. A turbojet-engine thrust reverser according to claim 11, wherein the displacement mechanism further comprises:

a plurality of slide guides mounted on the displaceable structure; and a corresponding plurality of guide rods connected to the stationary structure, the guide rods being slideably disposed in the slide guides for axial displacement of the displaceable structure.

14. A turbojet-engine thrust reverser according to claim 11, further comprising:

a vibration damper which is mounted between each clamshell and the displaceable structure.

15. A turbojet-engine thrust reverser according to claim 14, wherein the vibration damper comprises a spring system.

* * * * *